(12) United States Patent
Hashizume et al.

(10) Patent No.: US 6,191,920 B1
(45) Date of Patent: Feb. 20, 2001

(54) TAPE CASSETTE WITH TAPE GUIDES PRESS-FIT OVER RIBBED GUIDE POSTS

(75) Inventors: Kenji Hashizume, Miyota-machi; Masatoshi Okamura, Saku; Shinichi Sato, Komoro, all of (JP)

(73) Assignee: TDK Corporation, Tokyo (JP)

( * ) Notice: Under 35 U.S.C. 154(b), the term of this patent shall be extended for 0 days.

(21) Appl. No.: 09/232,350

(22) Filed: Jan. 15, 1999

(30) Foreign Application Priority Data

Jan. 23, 1998 (JP) ................................................. 10-025197

(51) Int. Cl.⁷ .................................................... G11B 23/02
(52) U.S. Cl. ............................................. 360/132; 242/346
(58) Field of Search ............................ 360/132; 242/325, 242/364.3

(56) References Cited

U.S. PATENT DOCUMENTS

| 3,889,900 | | 6/1975 | Nelson . | |
|---|---|---|---|---|
| 5,034,839 | | 7/1991 | Okamura et al. . | |
| 5,074,451 | * | 12/1991 | Tollefson | 242/196 |
| 5,234,178 | * | 8/1993 | Schoettle | 242/199 |
| 5,440,439 | * | 8/1995 | Rambosek | 360/132 |
| 5,513,815 | * | 5/1996 | Erickson | 242/346 |
| 5,522,562 | * | 6/1996 | Stanley | 242/342 |
| 5,542,593 | * | 8/1996 | Skaar | 360/130.21 |
| 5,777,831 | * | 7/1998 | Konno | 360/132 |

FOREIGN PATENT DOCUMENTS

| 9017066 | 4/1991 | (DE) . |
|---|---|---|
| 0187319 A1 | 12/1985 | (EP) . |
| 0430433A2 | 6/1991 | (EP) . |
| 0502483 A2 | 9/1992 | (EP) . |
| 0853316 A2 | 7/1998 | (EP) . |
| 2211817 | 7/1989 | (GB) . |
| 2255966 | 11/1992 | (GB) . |
| 2314087 | 12/1997 | (GB) . |
| 3-187081 | 8/1991 | (JP) . |

* cited by examiner

*Primary Examiner*—A. J. Heinz
(74) *Attorney, Agent, or Firm*—Wood, Phillips, VanSanten, Clark & Mortimer

(57) ABSTRACT

A tape cassette comprising a housing made up of upper and lower casings, a pair of reels around which a tape is wound and contained altogether in the housing, and a pair of cylindrical resin tape guides having a height greater than the width of the tape, said tape guides being securely fitted to corresponding tape guide posts also having a height greater than the width of the tape and provided in the lower casing. Each tape guide post has a press-fit rib formed in one piece with it on the side where the tape does not come in contact with the tape guide on it. The rib has a vertical height greater than half that of the tape guide and serves to make the dimensions of the tape guide post surface on the tape-contacting side greater than the inside diameter of the tape guide before being press-fitted.

6 Claims, 6 Drawing Sheets

TAPE CASSETTE WITH TAPE GUIDES PRESS-FIT OVER RIBBED GUIDE POSTS

BACKGROUND OF THE INVENTION

This invention relates to a tape cassette and, more particularly to a tape cassette having tape guides not formed in one piece with the housing of the cassette such as the VHS video cassette.

Conventional tape cassettes, such as for VHS video tapes, comprise an upper casing and a lower casing molded separately and joined together to form a cassette housing, a pair of tape reels contained in the housing, with a length of tape wound around one of the reels so as to be supplied to and taken up by the other reel. To guide the tape, there are usually provided a pair of tape guides, right and left, inside the housing.

For the purpose of proper guiding, the tape guides must be fixed rather than being turnable so that the vertical straightness of the guides can be secured and the wear of the posts supporting the guides be avoided.

To keep the tape guides unmovable, various proposals have been made. Japanese Utility Model Application Publn Kokai No. 54-70513 achieves the end by fitting a cylindrical metallic tape guide to each of tape guide posts molded in one piece with the cassette housing and having three or more axially extending projections formed on the post body.

Utility Model Application Publn Kokai No. 55-132783 discloses bosses on which cylindrical metallic tape guides are press-fitted. Each boss is formed with portions larger or smaller in diameter than the inside diameter or outside diameter of each tape guide in such manner that the guide fits immovably to the boss.

Patent Application Publn Kokai No. 3-187081 provides bosses on which cylindrical resin tape guides are fitted. The part of each boss that does not contact the tape is tapered and a rib is formed in the lower portion of the taper. A tape guide is then press-fitted to the boss.

It has been in practice to provide tape guide posts with ribs and then press-fit cylindrical tape guides, one for each, to the posts to keep them from turning. When the tape guides are made of metal, there is no possibility of the tape guides being deformed upon press fitting. However, they can wear off or deform ribs of plastic casings, or the need of polishing can add to the manufacture cost. In recent years tape guides made of resins have come into use. Resin tape guides have the danger of being deformed upon press fitting to their guide posts. Attempts to avoid this have been made as proposed by Patent Application Publn Kokai No. 3-187081 in which ribs are provided in locations where they are kept out of contact with the tape.

However, when resin tape guides are used, the height of the tape guide posts and that of the ribs along which the tape guides are to be press-fitted can sometimes deteriorate the (vertical) straightness of the tape guides, resulting in irregular sliding contact with the tape, unstable running of the tape, or partial elongation of the tape that makes recording or reproduction impossible.

BRIEF SUMMARY OF THE INVENTION

The present invention provides a tape cassette using resin tape guides characterized in that tape guide posts that support the guides have a height greater than the width of the tape and that press-fit ribs of a height greater than half that of the tape guides are formed, one for each, on the side of the tape guide posts opposite to the side where the tape comes in sliding contact with the tape guide to be fitted thereon.

More specifically, the invention provides a tape cassette comprising a housing made up of upper and lower casings, a pair of reels around which a tape is wound and contained altogether in the housing, and a pair of cylindrical resin tape guides having a height greater than the width of the tape, said tape guides being securely fitted to corresponding tape guide posts also having a height greater than the width of the tape and provided in the lower casing, characterized in that each said tape guide post has a press-fit rib formed in one piece therewith on the side where the tape does not come in contact with the tape guide thereon, said rib having a vertical height greater than half that of the tape guide and serving to make the dimensions of the tape guide post surface on the tape-contacting side greater than the inside diameter of the tape guide before being press-fitted.

DETAILED DESCRIPTION OF THE INVENTION

Figure 1:
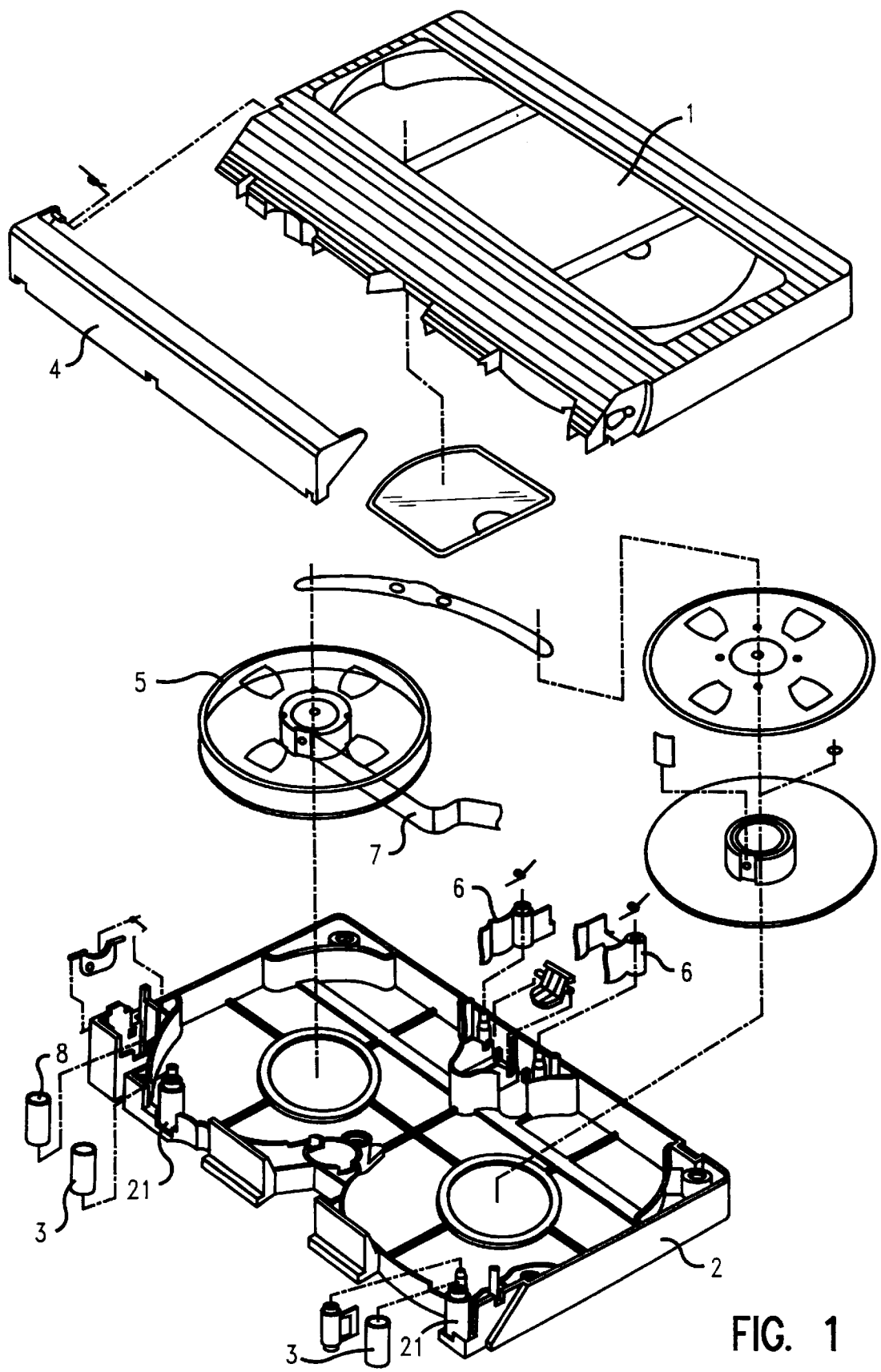
FIG. 1 is an exploded view of a VHS video cassette embodying the present invention.

According to the present invention, tape guides are kept from turning and their portions with which the tape comes into sliding contact are not deformed. Good precision (vertical straightness) is maintained at the time of assembling, and this stabilizes the running of the tape and causes no damage (deformation) of the tape.

As each tape guide is forced over a tape guide post provided with a press-fit rib, it is partially deformed. In order to avoid any adverse effect of the deformation upon tape guiding, it is desirable that the press-fit rib to be formed on the non-tape-contacting side of the post be greater than half, more desirably greater than two-thirds, or even more desirably approximately equal to, the height of the tape guide.

The tape guides to be used are made of resin with excellent sliding property and wear resistance, such as polyacetal (POM), polyethylene resin, polypropylene resin, or a composite of these resin, plus antistatic agent and/or other additives. Polystyrene (PS), ABS, or other similar resin usually used as housing material cannot be employed because, when the tape comes in sliding contact with it, such resin will easily wear off.

A desirable tape guide material is based on a composite resin material of polyethylene resin and polypropylene resin and contains carbon black and anisotropic inorganic filler. The guides of the material have the advantages of adequate mechanical properties, high wear resistance, and low cost.

For example, a formulation comprising from 60 to 90% by weight of a composite resin material of polyethylene resin and polypropylene resin, from 5 to 15% by weight of carbon black, and from 5 to 35% by weight of an anisotropic inorganic filler is desirable. If the proportion of the polyolefinic composite resin material that constitutes the main component of the formulation is less than 60% by weight, the resulting guides will have inferior surface smoothness and wear both themselves and the tape that comes in contact faster than otherwise. A proportion in excess of 90% by weight is again undesirable because of increased wear of the guides themselves.

The polyethylene resin and polypropylene resin are desirably mixed at a ratio of from 60 to 90% by weight to from 40 to 10% by weight. The mixture in this range has such good flow properties that it is excellently moldable and can provide moldings with favorable mechanical properties. When the proportion of the polypropylene resin is less than 10% by weight, the resulting tapes tend to show an increased coefficient of friction. Conversely when the polypropylene resin proportion exceeds 40% by weight, there arise tendencies toward higher friction coefficient and lower mechanical strength (tensile strength) and impact resistance.

Anisotropic inorganic fillers include the inorganic fillers of various shapes such as plate, scaly, fibrous, acicular, rod, columnar shapes. Plate and scaly fillers, for example, are talc, mica, graphite, and clay. Fibrous and acicular fillers include potassium titanate whiskers, fibrous magnesium oxysulfate, and zinc oxide whiskers. An example of columnar fillers is wollastonite. These examples are given by way of illustration and not to be construed to be limitative. When the proportion of the anisotropic inorganic filler is less than 5% by weight, the resulting guides have high friction coefficient and low surface hardness (being soft) which combinedly lead to increased abrasion wear. An anisotropic inorganic filler proportion of more than 35% by weight is undesirable either since it hardens the surface of the guides, deteriorates their surface properties, and accelerates the tape wear.

A carbon black proportion of less than 5% by weight is undesirable because of increased static influences. A proportion of more than 15% by weight is also undesirable because it increases the friction coefficient and accelerates the wear of both tape guides and the tape that come in contact with them alike.

FIG. 1 is an exploded view of a VHS video cassette embodying the present invention.

A cassette housing made up of upper and lower casings 1, 2 accommodates rotatably a pair of reels 5 around which a tape 7 is wound. At the front of the upper and lower casings 1, 2 are formed openings 21, 21 through which the tape is partly exposed to the outside. In the openings are provided tape guides 3, 3, one for each, with which the tape comes in sliding contact as it is driven past them. A front lid 4 is pivotally connected to the housing so as to cover the tape portion that is in the frontal part of the casing when the cassette is not used. In the rear center of the cassette housing are located a pair of reel detents 6, 6 that keep the reels 5 from turning while the cassette is not in use.

The tape guides 3 are cylindrically formed of a resin composition of excellent sliding property and wear resistance comprising polyacetal (POM) or a polyethylene-polypropylene composite resin, an antistatic agent and/or other additives. As will be explained later, they preferably have a wall thin enough to fit well with the corresponding tape guide posts. The greater the height of the press-fit ribs the thinner the wall may be.

Figure 2:
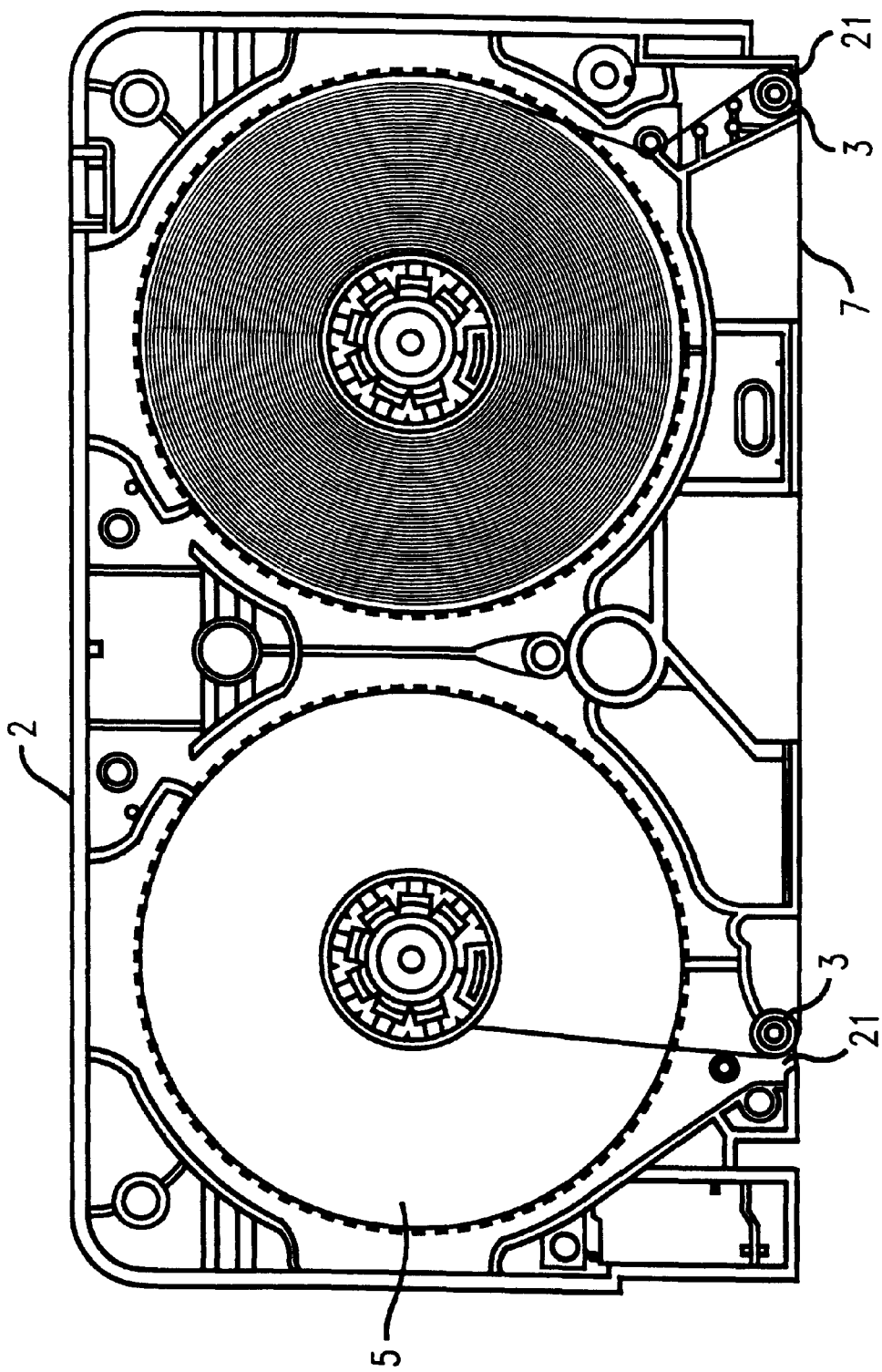
FIG. 2 is a plan view of the lower casing with the reels and the tape guides mounted in place.

FIG. 2 is a plan view of the lower casing 2 with the reels 5 around which the tape 7 is wound and the tape guides mounted in place. It will be seen that the surface portions of the tape guides with which the tape 7 comes in sliding contact are limited.

Figure 3A:
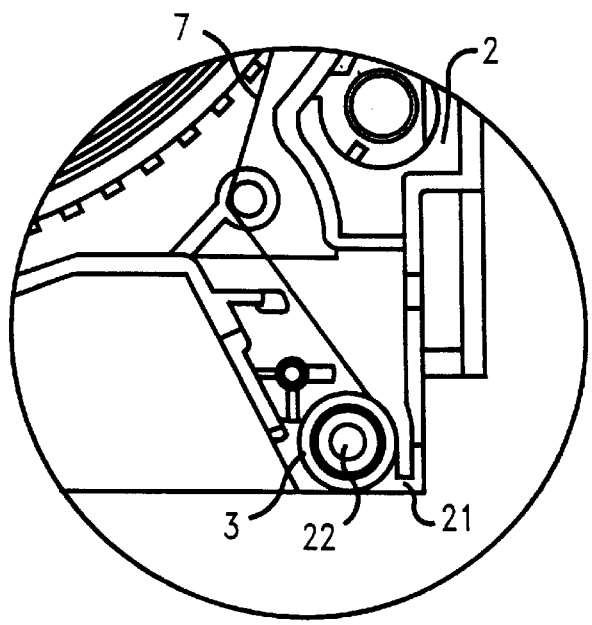
FIG. 3 shows tape guide portions in enlarged plan views, (a) being the tape guide portion on the take-up side and (b) the tape guide portion on the supply side.
Figure 3B:
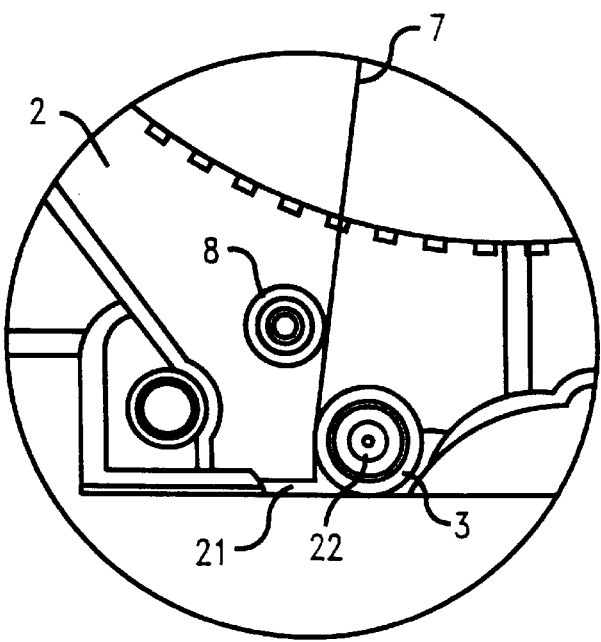

In FIG. 3 the tape guide portions in the lower casing 2 are shown in an enlarged scale at (a) (the tape guide portion on the take-up side) and at (b) (the tape guide portion on the supply side). The height of the tape guide posts 22 is greater than the width of the tape. This helps maintain the vertical straightness of at least the portions of the tape guides 3 that contact the tape 7 when the guides are press-fitted to the respective posts 22.

Figure 4:
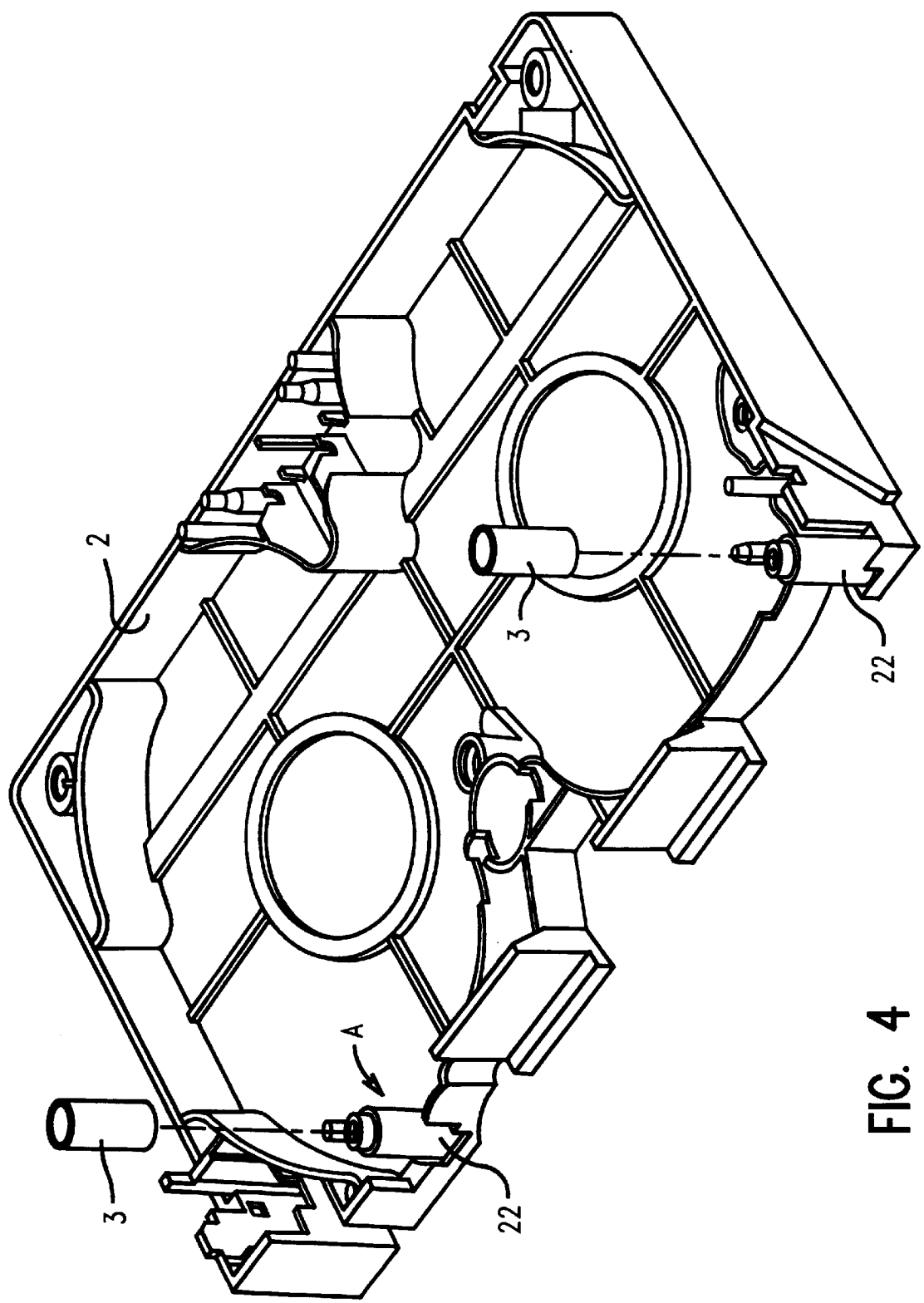
FIG. 4 is a perspective view of the lower casing and the tape guides.
Figure 5:
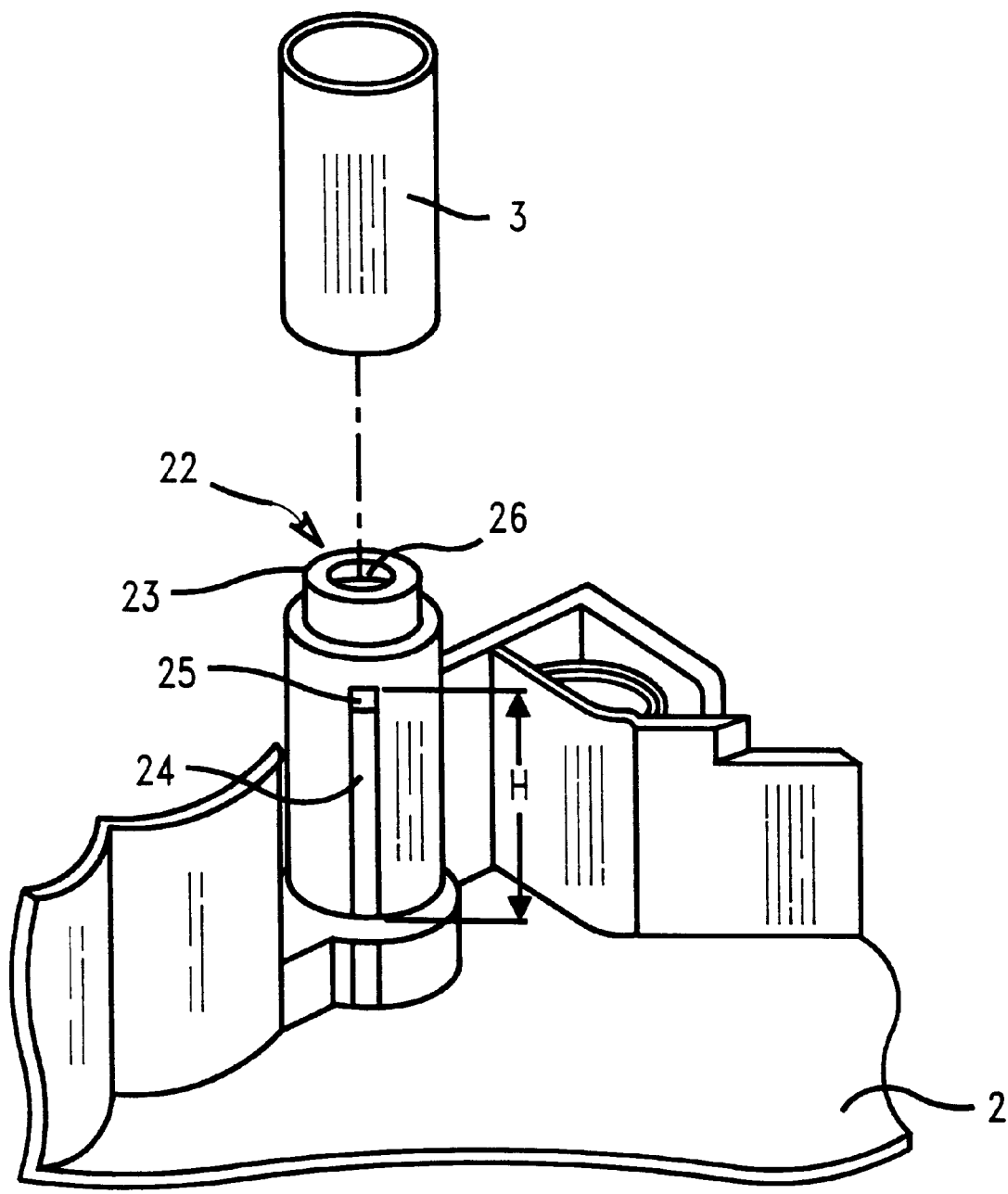
FIG. 5 is a perspective view of the essential parts as seen in the direction of the arrow A of FIG. 4.

FIG. 4 is a perspective view of the lower casing 2 and the tape guides 3, and FIG. 5 is a perspective view of the tape guide on the take-up side as seen in the direction of the arrow A of FIG. 4. The top end 23 of the tape guide post 22 is slightly reduced in diameter to facilitate the fitting of the tape guide 3 to the post. A press-fit rib 24 is formed on the side of the tape guide post 22 opposite to the side where the tape guide to be fitted thereon contacts the tape, with a vertical height (H) greater than half that of the guide 3. The rib is preferably two-thirds or more as high as the guide. A rib of insufficient height can deteriorate the geometric accuracy of the guide-post assembly, resulting in an inclination from the vertical or wobbling of the tape guide 3. The upper end of the press-fit rib 24 may be beveled as at 25 to make the assembling with the tape guide 3 easier. A recess 26 formed at the top of the tape guide post 22 is adapted to receive a boss of the upper casing 1 (not shown) when the upper and lower casings are to be joined together to support the tape guide post 22 upright.

Figure 6:
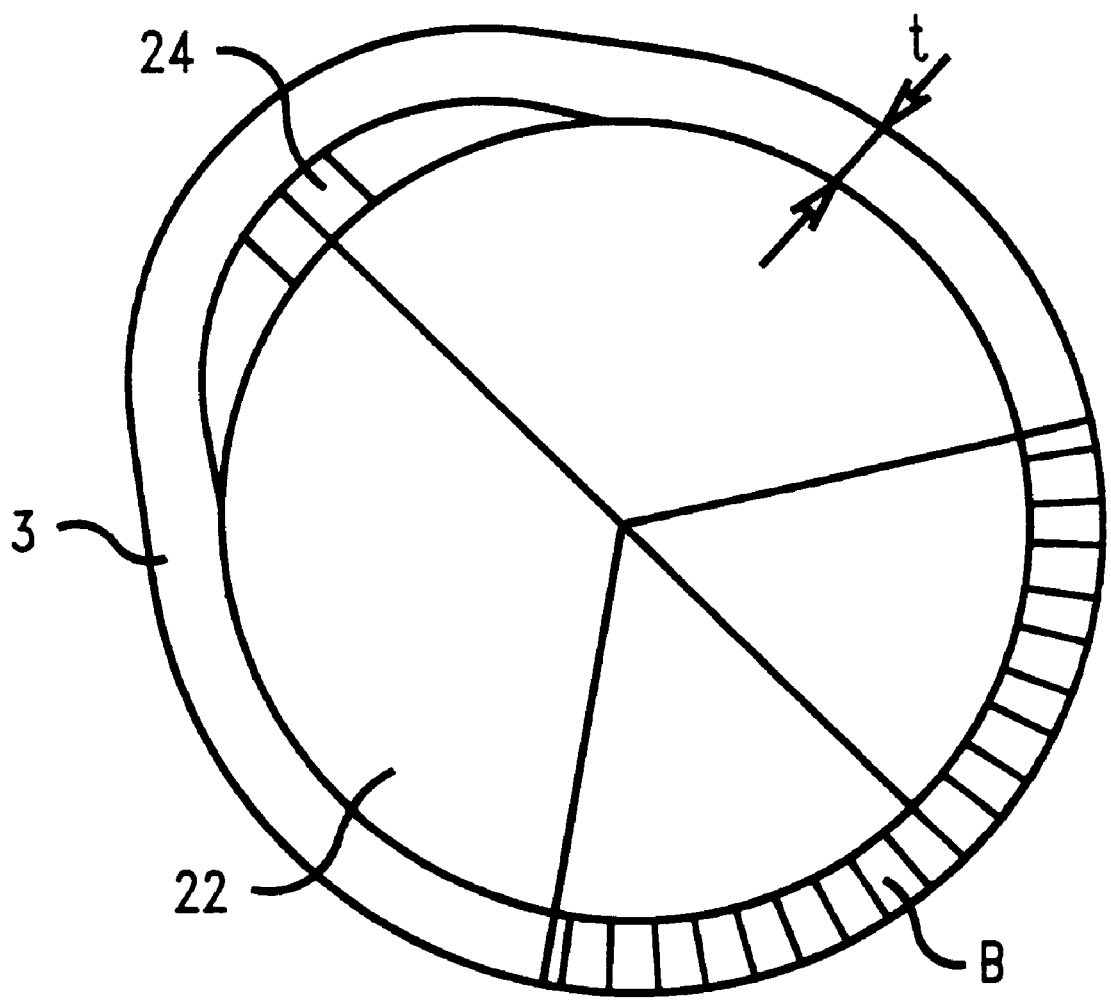
FIG. 6 is a plan view of a tape guide press-fitted in place.

FIG. 6 is an enlarged plan view of the tape guide 3 (press-)fitted to the tape guide post 22. Here the illustration of the reduced-diameter portion 23 and recess 26 at the top of the tape guide post is omitted.

The press-fit rib 24 has a vertical height greater than half that of the tape guide and serves to make the dimensions of the tape guide post surface on the tape-contacting side greater than the inside diameter of the tape guide before being press-fitted.

The press-fit rib 24 causes deformation of the tape guide 3 along the rib as shown in FIG. 6, thereby keeping the guide from turning. Accordingly the tape guide 3 is limited in wall thickness t to 1.2 mm or less for ease of deformation to some extent (since a wall thicker than this would make the guide less deformable).

As the tape guide 3 is forced over the tape guide post 22, the guide is urged outwardly by the press-fit rib 24 so that the opposite side in the tape-contacting range B of the guide 3 fits conforming to the contour of the post 22. This arrangement prevents any decrease in the geometric accuracy of the resulting assembly.

The location of the press-fit rib 24 may be anywhere outside the tape-contacting range B. However, because the tape guide 3 is deformed around the press-fit rib 24, the rib is preferably formed at a point opposite to the center of the tape-contacting range B. The width and other dimensions of the press-fit rib are of little significance and may be suitably chosen.

According to the present invention, tape guides are kept from turning and their portions with which the tape comes into sliding contact are not deformed. Good precision (vertical straightness) is maintained at the time of assembling, and this stabilizes the running of the tape and causes no damage (deformation) of the tape. The tape guide material, based on a composite resin material of polyethylene resin and polypropylene resin and additionally comprising carbon black and an anisotropic inorganic filler, provides tape guides with excellent flexibility, mechanical properties, and wear resistance.

What is claimed is:

1. A tape cassette comprising a housing made up of upper and lower casings, a pair of reels around which a tape is wound and contained altogether in the housing, and a pair of cylindrical resin tape guides having a height greater than the width of the tape, said tape guides being securely fitted to corresponding tape guide posts also having a height greater than the width of the tape and provided in the lower casing, each said tape guide post having a press-fit rib formed in one piece therewith on the side where the tape does not come in contact with the tape guide thereon, said rib having a vertical height greater than half that of the tape guide and serving to make the dimensions of the tape guide post surface on the tape-contacting side greater than the inside diameter of the tape guide before being press-fitted.

2. The tape cassette according to claim 1 wherein the resin tape guides have a wall thickness of not greater than 1.2 mm and are adapted to be press-fitted to the tape guide posts and press-fit ribs thereon so that the tape-contacting portion of each tape guide fits conforming to the contour of the corresponding portion of each tape guide post.

3. Tape guides for the tape cassette according to claim 1 or 2 wherein the resin tape guides are made of a composition based on a composite resin material of polyethylene resin and polypropylene resin and containing carbon black and an anisotropic inorganic filler.

4. The tape guides according to claim 3 wherein the composition comprises from 60 to 90% by weight of the composite resin material of polyethylene resin and polypropylene resin, from 5 to 15% by weight of the carbon black, and from 5 to 35% by weight of the anisotropic inorganic filler.

5. The tape guides according to claim 4 wherein the mixing ratio of the polyethylene resin to the polypropylene resin in the composite resin material is in the range of from 60 to 90% by weight to from 40 to 10% by weight.

6. The tape guides according to claim 3 wherein the mixing ratio of the polyethylene resin to the polypropylene resin in the composite resin material is in the range of from 60 to 90% by weight to from 40 to 10% by weight.

* * * * *